(12) United States Patent
Becker et al.

(10) Patent No.: US 8,462,358 B2
(45) Date of Patent: Jun. 11, 2013

(54) DEVICE FOR DETECTING MOVEMENT AND FORCES

(75) Inventors: Frank Becker, Seefeld (DE); Manfred Engelhardt, Grafrath (DE)

(73) Assignee: Spacecontrol GmbH, Seefeld (DE)

( * ) Notice: Subject to any disclaimer, the term of this patent is extended or adjusted under 35 U.S.C. 154(b) by 570 days.

(21) Appl. No.: 12/519,246

(22) PCT Filed: Oct. 18, 2007

(86) PCT No.: PCT/EP2007/009047
§ 371 (c)(1),
(2), (4) Date: Sep. 24, 2009

(87) PCT Pub. No.: WO2008/071251
PCT Pub. Date: Jun. 19, 2008

(65) Prior Publication Data
US 2010/0027033 A1 Feb. 4, 2010

(30) Foreign Application Priority Data
Dec. 13, 2006 (DE) .......................... 10 2006 058 805

(51) Int. Cl.
*G01B 11/14* (2006.01)
*G01J 1/42* (2006.01)
*H01J 40/14* (2006.01)
*G01D 7/00* (2006.01)
*G01D 5/34* (2006.01)
*G01P 15/08* (2006.01)

(52) U.S. Cl.
USPC ..... 356/614; 250/208.6; 250/221; 250/231.1; 73/514.26; 73/862.041

(58) Field of Classification Search
None
See application file for complete search history.

(56) References Cited

U.S. PATENT DOCUMENTS

| 4,785,180 | A * | 11/1988 | Dietrich et al. ............ 250/208.6 |
| 5,132,531 | A * | 7/1992 | Duncan et al. ........... 250/231.13 |
| 5,272,335 | A * | 12/1993 | Nakaho .................... 250/231.13 |
| 5,345,689 | A * | 9/1994 | McMurtry et al. .............. 33/559 |
| 6,529,281 | B2 * | 3/2003 | Takeshita et al. ............. 356/614 |
| 2002/0056326 | A1 * | 5/2002 | Gombert et al. ......... 73/862.046 |
| 2002/0167583 | A1 * | 11/2002 | Binford et al. ................ 347/234 |
| 2003/0070496 | A1 * | 4/2003 | Meusel et al. ........... 73/862.041 |
| 2003/0102422 | A1 * | 6/2003 | Gombert .................... 250/206.1 |
| 2003/0102426 | A1 * | 6/2003 | Gombert ...................... 250/221 |
| 2003/0103217 | A1 * | 6/2003 | Gombert ...................... 356/614 |
| 2004/0129899 | A1 * | 7/2004 | Gombert ...................... 250/548 |

(Continued)

FOREIGN PATENT DOCUMENTS

DE 3611337 10/1987
DE 10057351 5/2002

(Continued)

OTHER PUBLICATIONS

International Search Report for corresponding application No. PCT/EP2007/009047 completed Oct. 9, 2008.

*Primary Examiner* — Gordon Stock, Jr.
(74) *Attorney, Agent, or Firm* — Renner, Otto, Boisselle & Sklar, LLP

(57) ABSTRACT

The invention relates to an apparatus for input of movements and/or registration of forces, comprising at least one light source, at least one position sensitive device (PSD) and at least one diaphragm, wherein at least one of these three elements is moveable with respect to the two other elements. The light source is arranged at a mounting so that light from the light source is emitted through an opening in the mounting and through the at least one diaphragm onto the at least one PSD.

12 Claims, 5 Drawing Sheets

U.S. PATENT DOCUMENTS

Figure 1:
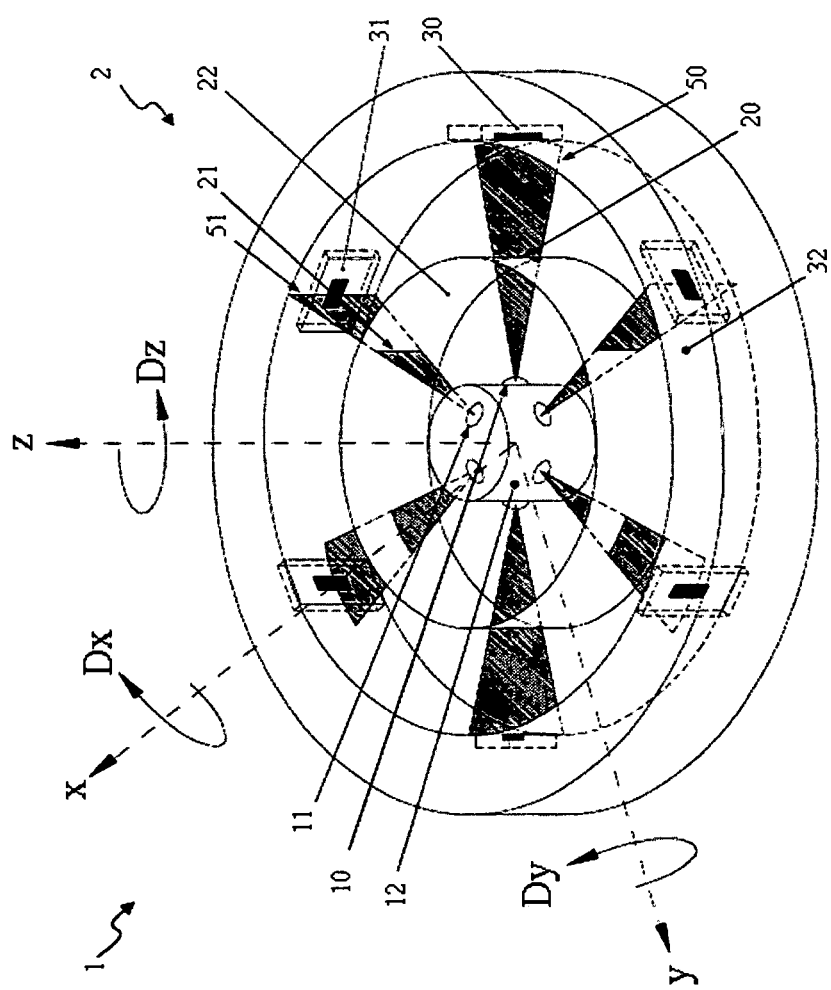

| | | | |
|---|---|---|---|
| 2005/0172711 A1* | 8/2005 | Gombert | 73/161 |
| 2006/0086889 A1* | 4/2006 | Pascucci et al. | 250/206.1 |

FOREIGN PATENT DOCUMENTS

| | | |
|---|---|---|
| DE | 10158775 | 6/2003 |
| DE | 10158776 | 6/2003 |
| DE | 10158777 | 6/2003 |
| DE | 10211956 | 10/2003 |
| EP | 0240023 | 10/1987 |
| EP | 1653199 | 5/2006 |
| JP | 05142027 A * | 6/1993 |
| JP | 05181084 A * | 7/1993 |

* cited by examiner

DEVICE FOR DETECTING MOVEMENT AND FORCES

1. TECHNICAL FIELD

The invention relates to an apparatus for registering movements and forces.

2. THE PRIOR ART

Arrangements with opto-electronic measuring cells are conventionally used for registering relative movements or relative positions of two objects in force sensors and/or momentum sensors. The reason is the simple design in connection with high precision and reliability.

DE 36 11 337 A1 discloses an opto-electronic arrangement in a plastic cap which can simultaneously register six components, namely translations along three axes and angular rotations around three axes. To this end, six light-emitting devices are arranged in a plane at equal angular distances. Each light-emitting device has a fixedly arranged slit diaphragm in front of it. The relative movements or relative positions are determined by light-sensitive detectors which are movably arranged with respect to the light-emitting devices and slit diaphragms and whose detector axis is essentially orthogonal to the slit direction.

This arrangement requires relatively small construction efforts since the light-emitting devices and slit diaphragms and, if applicable, other electronic devices for controlling and evaluating can be arranged using conventional welding on a single printed circuit board which can be fixedly connected to a first object. The position-sensitive detectors are connected to a second object.

A disadvantage of this arrangement is that it requires a relatively large area. The reason is the relatively large spatial extension of the diaphragms and detectors which are arranged in a circle around the light emission devices. This limits a miniaturization of the arrangement. A miniaturization, on the other hand, would enable the integration into, for example, game consoles, PC keyboards or notebook computers and thereby lead to higher market shares.

Further documents which show the technical background of the invention are DE 10 15 87 75 A1, DE 10 15 87 76 A1, and DE 10 15 87 77 A1.

However, miniaturisation puts higher demands on the manufacture of such an opto-electronic arrangement. For example, it is frequently required to adjust the position-sensitive detectors after mounting. This adjustment becomes more difficult the smaller the arrangement is. Due to cost reasons it is anyhow desirable to completely dispense with any adjustment.

It is therefore the problem of the present invention to provide an arrangement for registering movements and forces which avoids the disadvantages of the prior art, enables a smaller design and which can be manufactured easily and with low cost.

3. SUMMARY OF THE INVENTION

According to one aspect of the invention, this problem is solved by an apparatus for input of movements and/or registering of forces comprising at least one light source, at least one position sensitive device (PSD) and at least one diaphragm, wherein at least one of these three elements is movable with respect to the two other elements. The light source is arranged at a mounting so that light is emitted from the light source through an opening in the mounting and through the at least one diaphragm onto the at least one PSD. The mounting is arranged between the light source and the PSD.

In the known opto-electronic measuring apparatuses, a light emission diode (LED) is arranged on one side of a printed circuit board and emits its light to this side of the printed circuit board. The extension of this measuring apparatus is essentially determined by the distance between the PSD and the printed circuit board comprising the LED. A simple inversion of this arrangement allows a substantially more compact design: Since according to the invention a light source emits its light through an opening in a mounting, i.e. exactly opposite to the conventional direction, space is gained, since the mounting of the light source is shifted to the space between the light source and the PSD.

In a preferred embodiment, the apparatus comprises several mountings which are arranged so that an inner area is delimited. In this arrangement, the light sources are arranged in the inner area and the PSDs are arranged outside the inner area.

By delimiting an inner area, the mountings of the light sources form a compact center. Other than in the prior art where bulky mountings or printed circuit boards form the center, compact light sources are located in the inner area so that less space is required. Since every light source emits its light through an opening in the mounting, the opening has the effect of a screen and therefore simultaneously protects against diffused light of the light source onto those PSDs which are not associated to the light source.

It is further preferred that the mounting comprises a printed circuit board and the light source comprises a light emission diode (LED), wherein the LED is arranged directly above a hole in the printed circuit board so that the LED emits its light through the hole. The use of these components enables a particularly simple structural design wherein a simple drill-hole in a printed circuit board forms the opening or screen guiding the light.

It is particularly preferred that the apparatus comprises six mountings which are arranged in a hexagon. This enables an apparatus for input of movements and/or registration of forces which can register translations along three axes and angular rotations around three axes. The hexagonal arrangement simultaneously provides a compact shape of the inner area.

In a further embodiment, the mountings comprise at least one printed circuit board wherein the mountings are movably connected by a layer of the printed circuit board. This contributes to a simplification of the structural design of the apparatus since several mountings are not manufactured separately but from a single printed circuit board. In a further embodiment, the diaphragm through which the light passes which is emitted from the light source onto the PSD, is a slit diaphragm. Alternatively, the diaphragm can be a spot diaphragm or circular diaphragm. Both variants have respective advantages: measuring positions by using slit diaphragms is a simple and robust method. By using a spot diaphragm or circular diaphragm, the position of a spot can be registered in two dimensions on the PSD so that the measuring apparatus requires less components.

According to a further aspect of the invention, the apparatus for input of movements and/or registration of forces further comprises a support with an oblong hole for receiving a projection of a PSD holder, and a stop. The stop is arranged so that it prevents a movement of the PSD holder along the oblong hole.

In this embodiment, the problem of adjusting a PSD after mounting on a support is solved. This problem arises when a PSD holder with a projection is fixed in an oblong hole of the support. Since oblong holes are circular at their ends due to the circular tools employed, the PSD holder cannot be exactly positioned along the principle direction of the oblong hole. The invention solves this problem according to one aspect by a stop on the support which avoids a movement of the PSD holder along the oblong hole. It is therefore no more necessary to adjust the PSD after mounting which substantially simplifies the manufacture and also is a precondition for a miniaturization of the apparatus.

In preferred embodiments the stop is formed by a recess in the support, wherein the recess substantially extends orthogonally to the oblong hole. Further, the recess can be formed by an indentation at the boundary of the support. It is further preferred that the PSD holder comprises a pin so that the pin engages the recess.

Further preferred embodiments are described in further dependent claims.

4. SHORT DESCRIPTION OF THE DRAWINGS

Figure 3:
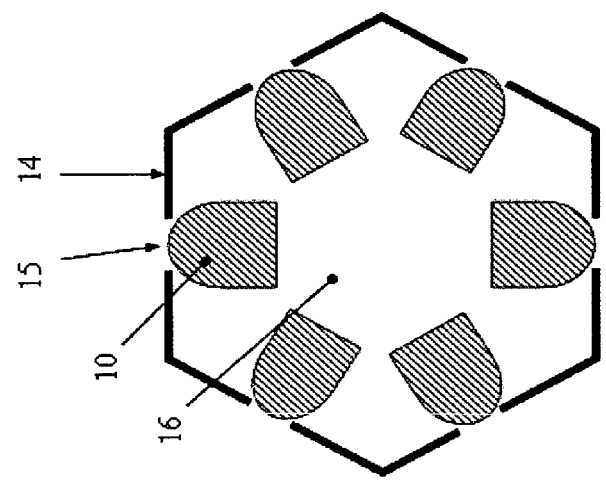
Figure 2:
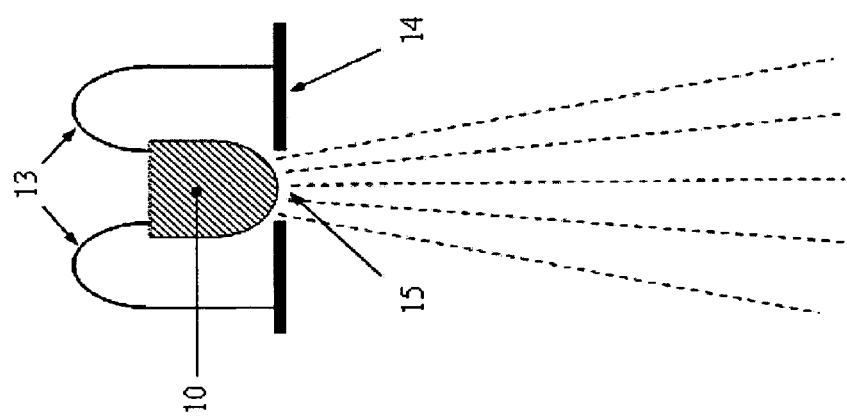
Figure 4:
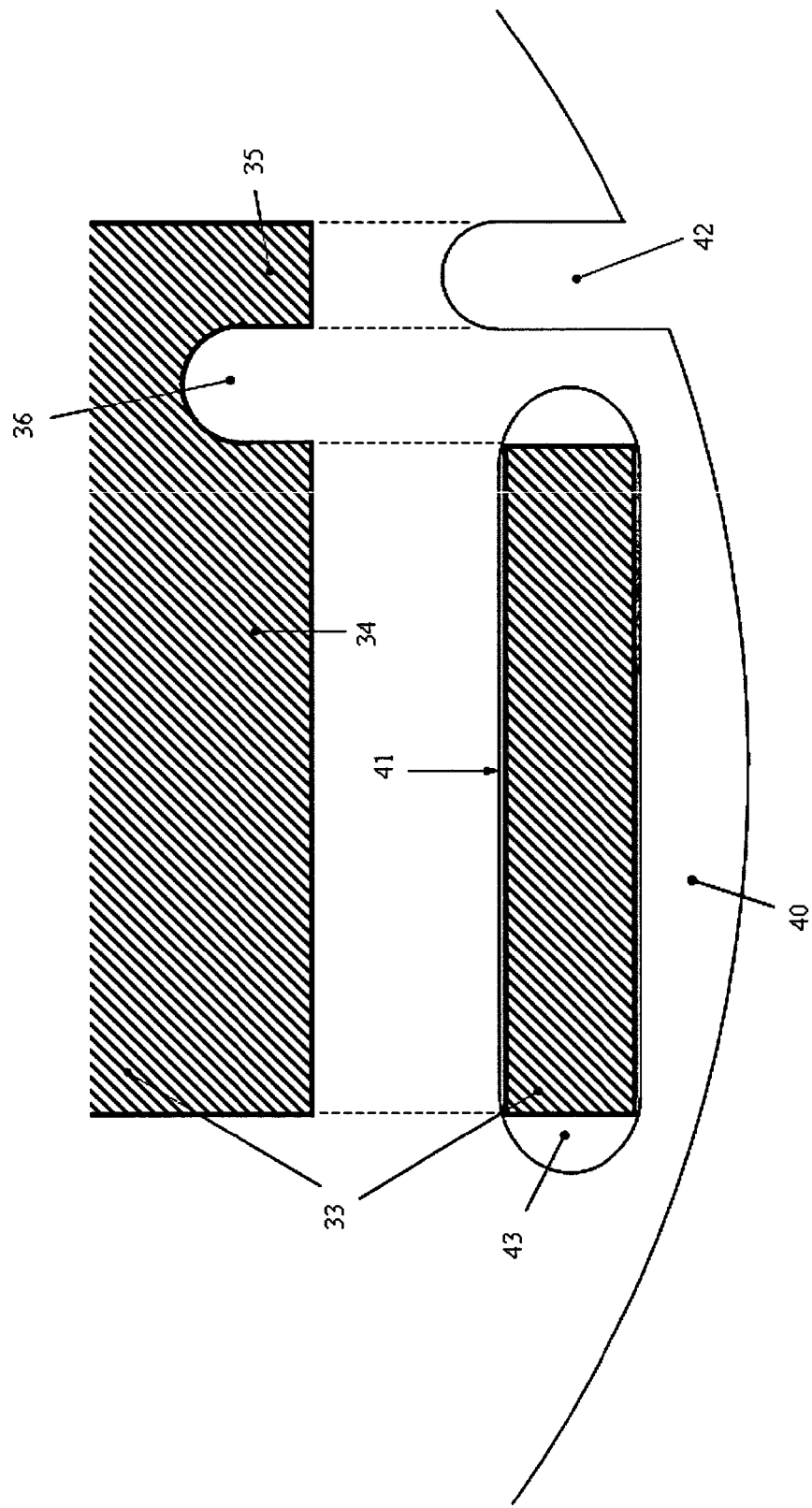
Figure 5:
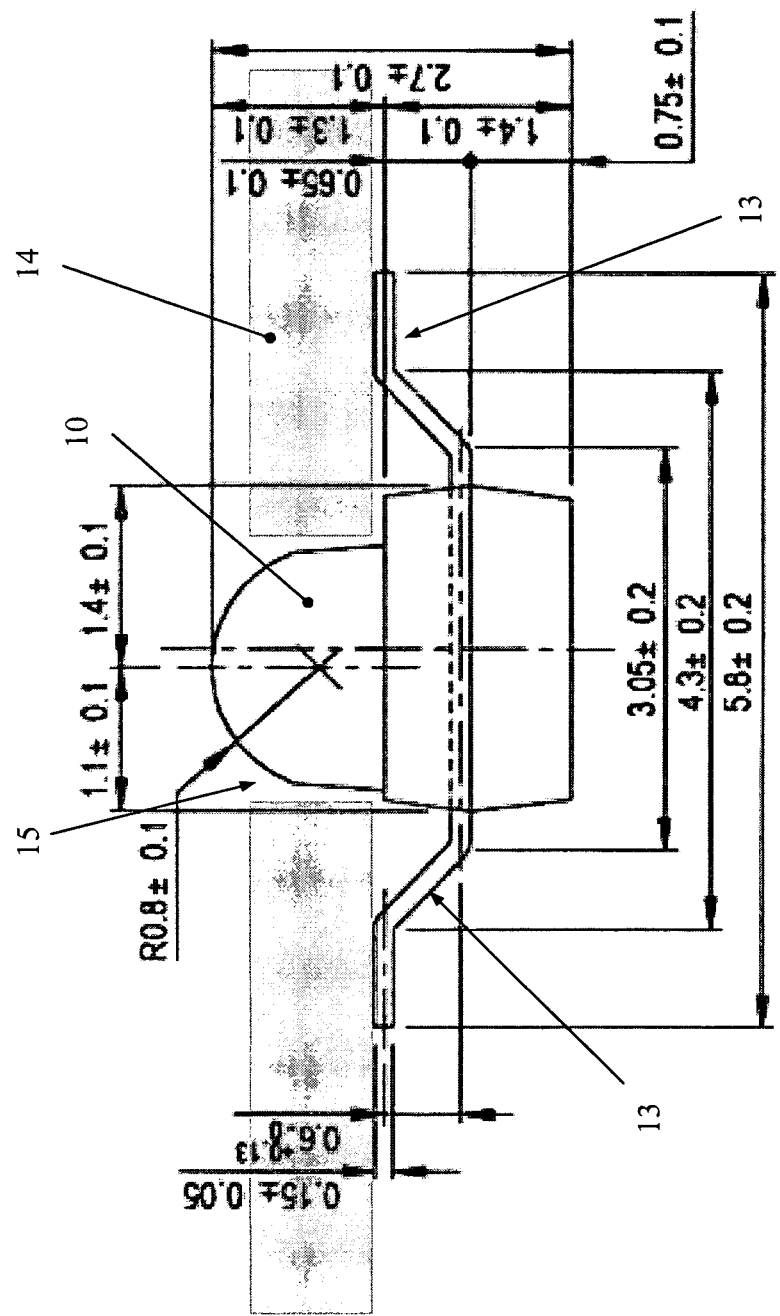
Figure 6:
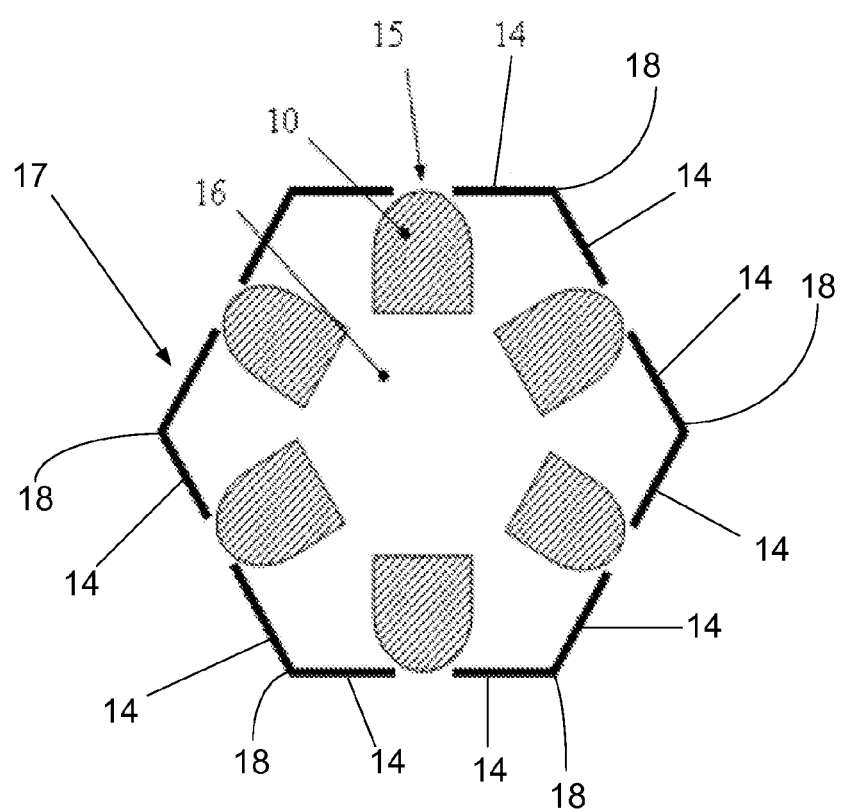

In the following detailed description currently preferred embodiments of the invention are described with respect to the following figures:

FIG. 1: shows a perspective view of a preferred embodiment of an apparatus for input of movements and/or registration of forces according to the invention;

FIG. 2: shows a view of a light source according to the invention;

FIG. 3: shows a schematic cross section of an arrangement of light sources according to the invention;

FIG. 4: shows a top view of a part of a support of the apparatus together with a side view of a part of a PSD holder; and FIG. 5: shows a preferred embodiment of the light source from FIG. 2; and FIG. 6: shows another schematic cross section of an arrangement of light sources according to the invention.

5. DETAILED DESCRIPTION OF PREFERRED EMBODIMENTS

In the following, presently preferred embodiments of the present invention are described with respect to an apparatus for input of movements and/or registration of forces. However, it is to be understood that the invention can be used in other fields, for example measuring of accelerations.

FIG. 1 shows a perspective view of an apparatus 1 for input of movements and/or registration of forces, which is designated in the following as 3D measuring system 1.

As can be recognised in FIG. 1, a basis measuring system 2 of 3D measuring system 1 comprises a light emitting diode (LED) 11, a slit diaphragm 21 and a linear position sensitive device (PSD) 31. Six of these basis measuring systems 2 are arranged in a plane, respectively shifted by 60 degrees, wherein the slit diaphragms 20, 21 and the PSDs 30, 31 are alternatingly rotated with respect to each other by 90 degrees, i.e. they are arranged in parallel or orthogonal to this plane. In other words, neighbouring slit diaphragms 20, 21 are orthogonal with respect to each other, neighbouring PSDs 30, 31 are orthogonal with respect to each other, and further slit diaphragm 21 and the oppositely arranged PSD 31 are orthogonal with respect to each other.

Inner cylinder 12 in FIG. 1 symbolises an arrangement of six LEDs 10, 11 which is described in more detail in the following. The six LEDs 10, 11 directly illuminate six movably arranged slit diaphragms 20, 21 which are arranged on diaphragm ring 22, i.e. the second cylinder from the inside.

The slit diaphragms 20, 21 are connected to a control cab or control sphere (not shown), wherein the input forces and moments are directly transferred to the movable slit diaphragms 20, 21. Since the LEDs 10, 11 and the PSDs 30, 31 are fixedly connected with apparatus 1, the lines of light 50, 51 emitted from slit diaphragms 20, 21 are registered by PSDs 30, 31 on outer cylinder 32.

As can be recognized in FIG. 1, due to the symmetric arrangements of the basis measuring systems 2, spatial displacements in x, y and z direction and the corresponding rotations Dx, Dy and Dz can be detected. These displacements are then transformed into an electric voltage by PSDs 30, 31, then converted into coordinates and output via an interface.

Due to its design, 3D-measuring system 1 operates without being influenced by temperature, aging, dirt, and component tolerances and is therefore an excellent choice for industrial applications. The complete 3D-measuring system 1 has been optimized so that it fits onto one side of a small SMD printed circuit board including analog signal processing, analog-to-digital conversion, signal evaluation and power supply.

In an alternative embodiment, ring 32 comprising PSDs 30, 31 is positioned on the inside of the control cab/control sphere (not shown) which is connected to the 3D-measuring system 1 by spiral springs.

Since PSDs 30, 31 measure the positions of the deflected line of light 50, 51 and not their intensities, the measuring principle is totally insensitive to intensity fluctuations, for example due to aging of the LEDs 10, 11. Therefore, the computational matrix for transforming the voltages of the PSDs 30, 31 to translations respectively rotations caused by forces respectively movements, does not require gauging.

Preferably, PSD 30, 31 is a lateral effect diode whose advantages are simplicity (direct detection of the center of gravity of the incoming light and therefore a low amount of data), the large usable sensor area and the very short response time. A light beam which hits the PSD 30, 31 creates a photo current (response time<3 µs) which is measured in two directions orthogonal to each other. The position of the light spot is calculated from the two photo currents. The desired position then can be calculated from the difference (U1−U2) of the two voltages U1 and U2 which are proportional to the output currents I1 and I2 of PSDs 30, 31. The exact relative position therefore is (U1−U2)/(U1+U2).

In principle, the size of the light spot or line of light 50, 51 on PSDs 30, 31 is not relevant since only its center is detected. However, it is desirable to achieve a small light spot in order to be able to use the whole area of PSDs 30, 31 for measurement. An optic which can be focussed (LED with lens) is therefore advantageous. Further, control of the light intensity requires providing sufficient intensity for creating photo currents. If the intensity is too small, the signal can not be discriminated from noise; if it is too large, saturation effects distort the determined position.

In an alternative embodiment, a spot diaphragm or circular diaphragm (not shown) is used instead of slit diaphragms 20, 21. In this way, instead of the one-dimensional deflection of slit diaphragm 20, 21, a two-dimensional position of the spot diaphragm can be detected on PSD 30, 31. 3D measuring system 1 can thereby be realised with a smaller number of basic measuring systems 2.

In further alternative embodiments, 3D-measuring system 1 comprises less than six basis measuring systems 2, in order to register a lower number of degrees of freedom.

FIG. 2 shows a view of a light source 10 according to the invention. In the figure, light source 10 with leads 13 can be recognized which are arranged on mounting 14. However, light source 10 does not emit its light bottom-up, but it is bent downwards and emits its light through opening 15 in mounting 14. Preferably, opening 15 is a circle which is slightly smaller than a horizontal diameter of LED 10. It is particularly preferred that the arrangement is realised by a LED 10 on a printed circuited board 14 into which a hole 15 is drilled, since it can be easily manufactured.

FIG. 3 shows a schematic cross section of an arrangement of light sources 10 according to the invention in which only light sources 10 and mountings 14 with openings 15 are represented. This arrangement is a preferred embodiment of inner cylinder 12 from FIG. 1. As can be recognized, mountings 14 are arranged so that they delimit an inner area 16 wherein light sources 10 are arranged in inner area 16. Preferably, the six mountings 14 are arranged in a hexagon and particularly preferred in a regular hexagon, as shown in FIG. 3.

FIG. 3 shows in particular that the arrangement of light source 10 which is shown in FIG. 2 leads to a particular small design of 3D measuring system 1 from FIG. 1. Namely, in this arrangement light sources 10 can be moved substantially closer to each other than in the conventional way where they are located outside inner area 16. Since the extension of 3D measuring system 1 is determined by the distance of light source 11 to PSD 31 (cf. FIG. 1), this enables a substantially smaller design.

A further advantage of the arrangement of FIG. 3 is protection against diffused light. Since every light source 10 emits light through opening 15 in mounting 14, opening 15 has the effect of a screen and thereby protects against diffused light of light source 10 onto those PSDs which are not associated to light source 10, for example PSD 31 in FIG. 1. Further protection against diffused light is provided by the closed surface formed by mountings 14.

In an alternative embodiment (not shown), four mountings 14 are arranged in a quadri-lateral and preferably in square. This enables registration of translations in two directions and the corresponding two rotations.

In the embodiment shown in FIG. 6, several mountings 14 are formed from a single printed circuit board 17 wherein the mountings 14 are movably connected by a layer 18 of the printed circuit board 17. This contributes to a further simplification of the design of the apparatus since the mountings do not have to be manufactured separately, but from single printed circuit board. Further, this does not require to connect separate mountings to each other since the mountings 14 are movably connected by a layer 18 of the printed circuit board 17, for example a copper foil on the outside of the printed circuit board 17 which is already present. This can be achieved by separating the printed circuit board 17 only partially, except for the copper foil, into the single mountings 14. The connection of the mountings 14 increases the stability of the design, simplifies the mounting and also prevents that diffused light from inner area 16 can leak to the outside.

FIG. 4 shows a top view of a part of a support 40 of 3D measuring system 1, together with a side view of a part of a PSD holder 33. In one embodiment, support 40 carries the at least one PSD holder 33 on which a PSD (not shown) is fixed. As can be recognized, PSD holder 33 is fixed by projection 34 in oblong hole 41 of support 40, so that PSD holder 33 is arranged essentially vertically on support 40.

As can be further recognized in FIG. 4, support 40 comprises a stop 42 which prevents a movement of the PSD holder along oblong hole 41. Preferably, stop 42 is formed by a recess 42 in support 40 which extends in an orthogonal direction to oblong hole 41. It is particularly preferred that recess 42 is formed by indentation 42 located at the boundary of support 40. This simplifies the manufacture of stop 42.

Stop 42 serves to receive pin 35 of PSD holder 33 which prevents movements of PSD holder 33 along oblong hole 41 and thereby enables an exact positioning of PSD 33.

This embodiment solves the problem known from the prior art where a PSD has to be adjusted on its support after mounting. Since oblong hole 41 has circular ends 43 due to the circular tools employed, PSD holder 33 can not be exactly positioned in the principle direction of oblong hole 41. Due to the exact positioning of the PSD holder by the arrangement described above, it is no more required to adjust the PSD after mounting. In this way, manufacture of 3D-manufacturing system 1 is substantially simplified which is a precondition for miniaturization.

In preferred embodiments stop 42 is formed by recess 42 in support 40 which extends substantially orthogonally to oblong hole 41. This allows a precise positioning of PSD holder 33 on support 40. Further, recess 42 can be realized by indentation 42 at the boundary of support 40, as can be recognized in FIG. 4, which can be easily manufactured.

FIG. 5 shows a preferred embodiment of the light source of FIG. 2. Light source 10 with leads 13 can be recognized which are arranged on mounting 14. Light source 10 emits its light through an opening 15 in mounting 14. Preferably, mounting 14 is a printed circuit board. As can be recognized in FIG. 5, the light-emitting side of light source 10 slightly extends above mounting 14. It is preferred that mounting 14 is a printed circuit board having a thickness of 1 mm and that light source 10 extends 0.2 mm above the printed circuit board.

The invention claimed is:

1. An apparatus for input of movements and/or registration of forces, comprising at least one light source, at least one position sensitive device (PSD) and at least one diaphragm, wherein at least one of the three elements is moveable with respect to the two other elements, and the at least one light source is arranged on a printed circuit board so that light from the at least one light source is emitted through an opening in the printed circuit board and through the at least one diaphragm onto the at least one PSD, and wherein the printed circuit board is arranged between the light source and the at least one PSD such that the opening has the effect of a screen for reducing light diffusion.

2. The apparatus according to claim 1, wherein the at least one light source comprises a light emission diode (LED), and wherein the LED is arranged directly above a hole in the printed circuit board so that the LED emits its light through the hole.

3. The apparatus according to claim 1, wherein the printed circuit board comprises six mountings which are arranged as a hexagon.

4. The apparatus according to claim 1, wherein the at least one diaphragm is a slit diaphragm.

5. The apparatus according to claim 1, wherein the printed circuit board comprises plural mountings which are arranged so that the plural mountings delimit an inner area, and wherein the at least one light source is located inside the inner area and wherein the at least one PSD is located outside the inner area.

6. The apparatus according to claim 1, further comprising:
a support comprising an oblong hole for receiving a projection of at least one PSD holder, and a stop which is arranged so that the stop prevents a movement of the at least one PSD holder along the oblong hole.

7. The apparatus according to claim 5, wherein the plural mountings are moveably connected by a layer of the printed circuit board.

8. The apparatus according to claim 6, wherein the stop is formed by a recess in the support.

9. The apparatus according to claim 8, wherein the recess extends essentially orthogonally to the oblong hole.

10. The apparatus according to claim 8, wherein the recess is formed by an indentation at a boundary of the support.

11. The apparatus according to claim 8, wherein the at least one PSD holder comprises a pin, and wherein the at least one PSD holder is arranged in the oblong hole so that the pin engages the recess.

12. The apparatus according to claim 11, wherein the pin is arranged at a boundary of the at least one PSD holder.

* * * * *

UNITED STATES PATENT AND TRADEMARK OFFICE
CERTIFICATE OF CORRECTION

PATENT NO.       : 8,462,358 B2                                        Page 1 of 1
APPLICATION NO. : 12/519246
DATED            : June 11, 2013
INVENTOR(S)      : Becker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 788 days.

Signed and Sealed this
Eighth Day of September, 2015

Michelle K. Lee
*Director of the United States Patent and Trademark Office*